Figure 1:
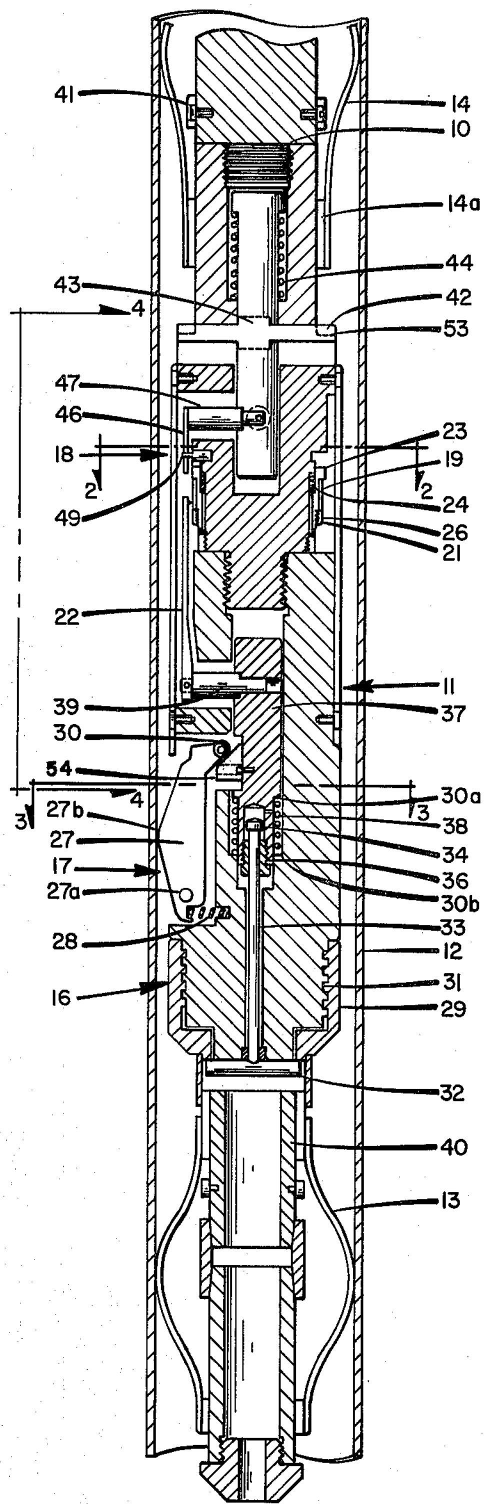

Nov. 9, 1965 R. P. VINCENT ETAL 3,216,122
DEVICE FOR RECORDING THE INSIDE
DIAMETER OF A TUBULAR OBJECT
Filed Oct. 9, 1963 3 Sheets-Sheet 1

FIG. I

RENIC P. VINCENT
JOE C. STALL
*INVENTORS:*

BY William F. McClain

ATTORNEY

Nov. 9, 1965 R. P. VINCENT ETAL 3,216,122
DEVICE FOR RECORDING THE INSIDE
DIAMETER OF A TUBULAR OBJECT
Filed Oct. 9, 1963 3 Sheets-Sheet 2

RENIC P. VINCENT
JOE C. STALL
*INVENTORS:*

BY William F. McClain

ATTORNEY

DEVICE FOR RECORDING THE INSIDE DIAMETER OF A TUBULAR OBJECT

Filed Oct. 9, 1963

3 Sheets-Sheet 3

RENIC P. VINCENT
JOE C. STALL
INVENTORS:

BY William T. McClain

ATTORNEY

United States Patent Office 3,216,122

Patented Nov. 9, 1965

1

3,216,122

DEVICE FOR RECORDING THE INSIDE DIAMETER OF A TUBULAR OBJECT

Renic P. Vincent and Joe C. Stall, Tulsa, Okla., assignors to Pan American Petroleum Corporation, Tulsa, Okla., a corporation of Delaware Filed Oct. 9, 1963, Ser. No. 314,922
14 Claims. (Cl. 33—178)

This invention relates to a device for making a record of a variable within a tubular object and particularly to a recording caliper for use in measuring the inside diameter of well tubing or other like conduits.

At times it is desirable to measure the inside diameter of a relatively short section of a conduit placed in a well bore. For example, a method and apparatus has heretofore been developed for installing a metallic liner in well casing wherein a metallic liner, such as a corrugated steel tube is expanded in place within a section of casing by an expander tool drawn through the corrugated tube to force it outwardly against the casing. When placing such a liner, it is highly desirable to know accurately the inside diameter of the casing to be lined in order that the die on the expander tool may be properly adjusted. Ordinarily the well record indicates the weight of casing installed in the well. However, errors are encountered in keeping such records and heavier weight casing may be actually present than is indicated by the records. In such instances, if the expanding tool is adjusted to be used in casing which, according to the erroneous record has a relatively large inside diameter, the pressure resulting from attempting to force the expander tool through the liner in the casing may cause dangerously high stresses which may damage the casing or to the installation tools. A similar problem may be encountered as a result of a reduction in the casing diameter due to collapse of the casing in the well bore.

Typically, metallic liners of the above type are installed in a section of casing which has been ruptured, and an impression tool may be run in the hole to determine the location and extent of damage to the casing. However, such tools will not shown variations in casing weight, or minor damage due to collapse may not be detected from the impression. Conventional calipering tools are available to indicate dimensions of the casing. However, such tools are adapted to provide a continuous caliper survey and are generally expensive and of complicated design. Further, such tools are run separately, as on a wire line, and the operation of such conventional tools is both costly and time consuming. Therefore, a relatively simple and inexpensive device is desirable which will accurately determine the condition of a section of casing in which a metallic liner is to be installed.

A general object of this invention is a simplified, rugged, relatively inexpensive, but accurate, device for making a record of a variable within a tubular object, such as well casing.

Another object of the invention is an improved recording caliper which may be run in a well conduit to accurately determine the inside diameter of the conduit over a predetermined, relatively short section.

Still a further object of the invention is a recording caliper which may be run in a well conduit with an impression tool to accurately measure the inside diameter of the conduit at a particular location without the necessity for expensive and time-consuming operations.

The above and other objects of the invention will become more apparent by reference to the following description of a preferred embodiment of the present invention and to the accompanying drawings wherein:

FIGURE 1 illustrates a cross-sectional view of a calipering device according to the invention; and

2

Figure 2:
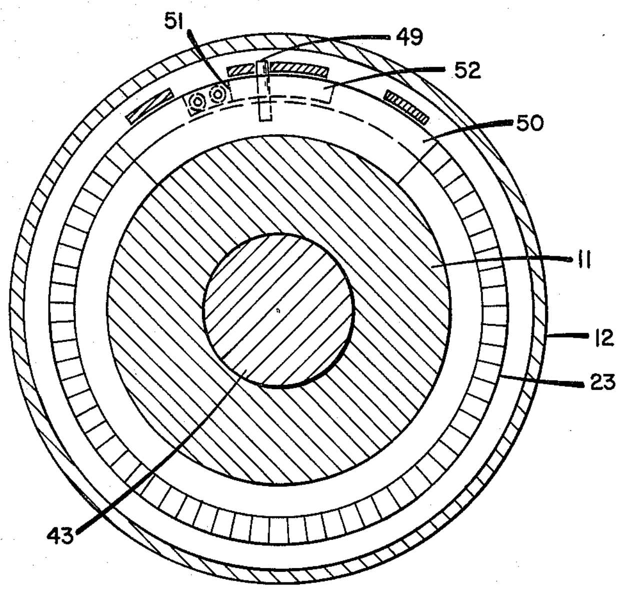
Figure 3:
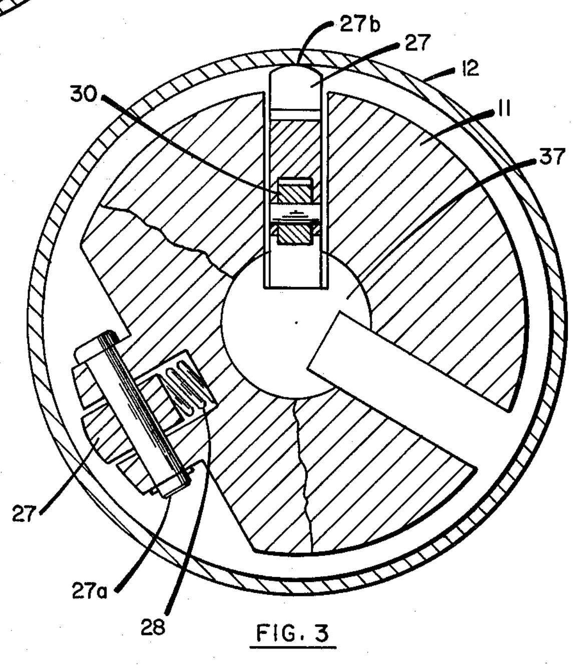
Figure 5:
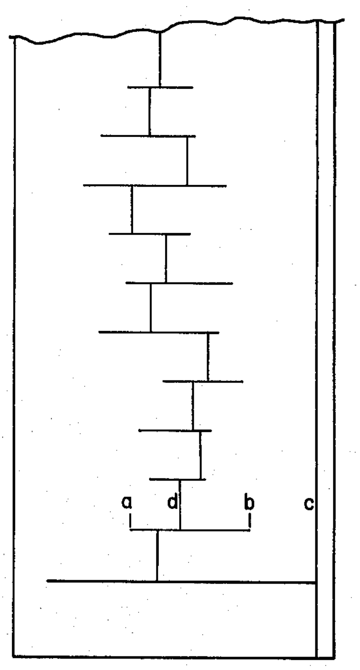
Figure 4:
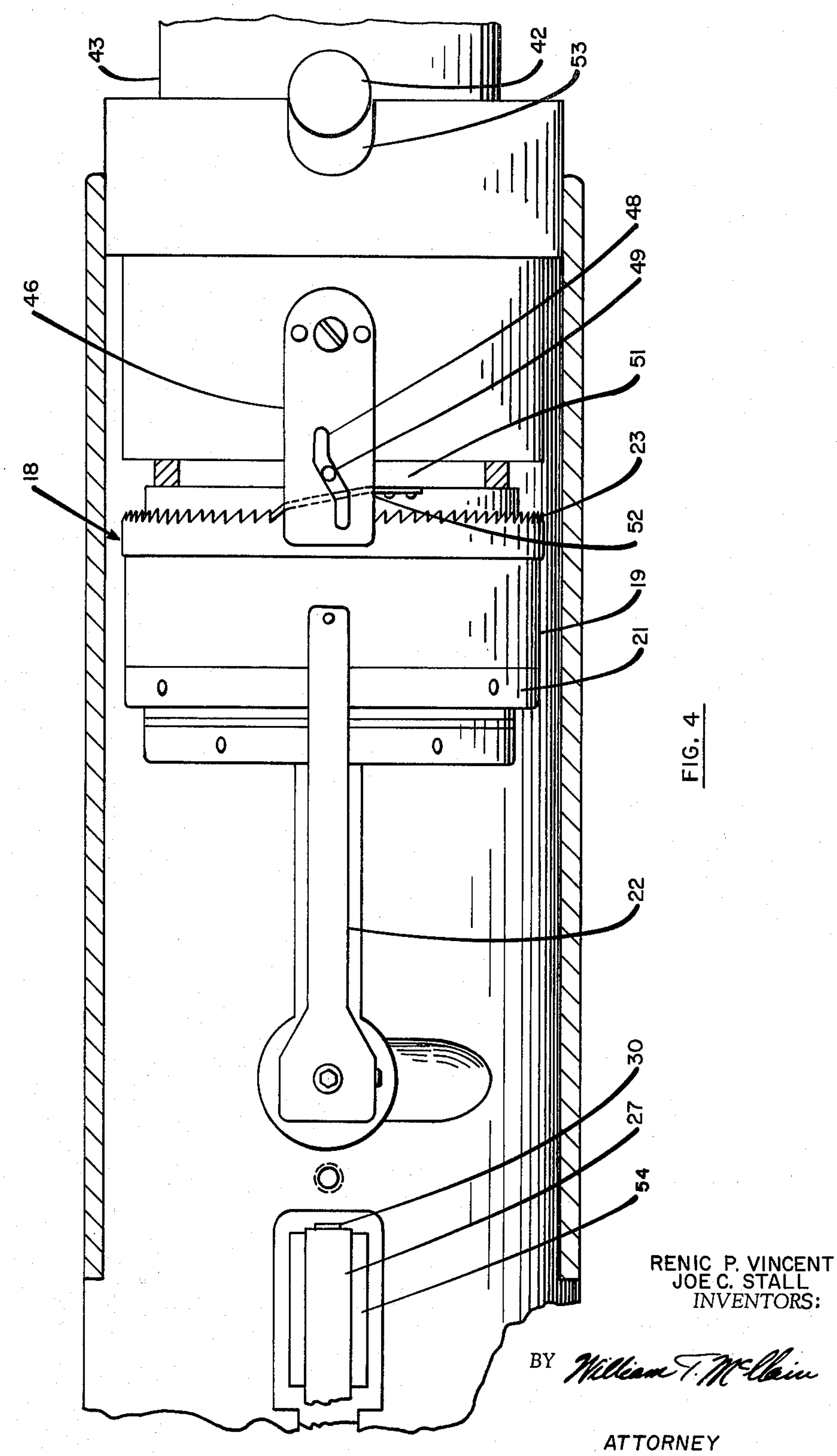

FIGURE 2 is a cross-sectional view of the device of FIGURE 1 taken at line 2—2; and FIGURE 3 is a cross-sectional view of the device of FIGURE 1 taken at line 3—3; and FIGURE 4 is an elevational view of the device of FIGURE 1 taken at line 4—4; and FIGURE 5 is illustrative of a typical record provided by the device of the present invention.

Briefly, the recording device comprises an elongated body member adapted to be inserted into a tubular object; a rotatable chart member mounted on the body member; a marking member supported by the body member to contact the surface of the chart member; and a drive member mounted on the body member to rotate the chart member when the device is moved in a reciprocating manner. A means is provided for disengaging the drive member from the chart member when the device is moved in a first direction and a means for re-engaging the disengaged drive member and chart member when the device is moved in a second direction so that the chart is rotated incrementally. Preferably, the marking member is connected to a sensing element, such as a calipering element contacting the wall of the tubular object, and actuated thereby to move in respect of the chart surface and record thereon a variable which is to be measured. Advantageously the device is provided with multiple caliper arms pivotally mounted on the body member to move radially and contact the inside wall of the tubular object in which the device is run, and the marking member is coupled to the caliper element and responsive to longitudinal movement thereof. In a preferred embodiment of the invention there is provided a latching mechanism operatively connected to the caliper element to move the caliper element into and out of the calipering position.

Referring to the drawings, wherein the same numbers are employed to indicate the same elements shown in the various figures, a preferred calipering device comprises a cylindrical, elongated body member 11 adapted to be inserted into and moved longitudinally within a tubular object, such as well casing or other such conduit, in which the inside diameter is to be measured. The device typically is coupled into a tubing string threaded into upper joint 10, and lowered inside the casing to the section to be calipered. The device is centralized in the casing 12 by a lower drag spring 13 and an upper drag spring 14 located at each end of the body member. Typically, these springs are bow springs which serve to centralize the device within the casing and the springs frictionally engage with the wall of the casing. The lower spring 13 is employed in actuating the latching mechanism 16 for extending or retracting the caliper element 17 and the upper spring 14 is employed to actuate the chart advance mechanism 18, both as hereinafter described.

A rotatable cylindrical chart member 19 is mounted coaxially on the body member and secured in place by means of a retainer ring 21. The chart is typically a brass cylinder, the surface of which is oxidized so that a permanent record is made thereon by the movement of a stylus 22 or other suitable marking member. However, other suitable surfaces may be employed which are capable of being marked by the marking member utilized therewith. At the upper end of the chart cylinder there is provided a circular gear member 23 which may be either removably attached to the cylinder, or integral therewith. A compression spring 24 may be employed to resiliently maintain the chart member in place, and bearings 26, typically sleeve bearings fabricated from a low friction material such as Teflon, may be employed to facilitate the rotation of the chart member on the body member.

Caliper arms 27 are pivotally connected to the body member by pivot pins $27a$ so that the gauging surface $27b$ may contact the inside wall of the conduit 12 when the arms move out radially from the body member. Helical compression springs 28 mounted between the lower end of each arm and the body member resiliently urge each caliper arm inwardly against the body member. When the sleeve 29, connected to the body member by screw threads 31, is backed off the body member, the caliper arms move into the non-operating retracted position and the device may be run in the hole to the desired point with minimum wear on the gauging surfaces of the arms. When the sleeve is backed off, bearing pin 32 and push rod 33 move downwardly in the body member and the enlarged end 34 of push rod 33 shoulders against bushing 36 threaded into central shaft 37 which is slidably positioned in a central cavity provided in the body member. Thus, when sleeve 29 is backed off the body member, central shaft 37 moves downwardly against the helical compression spring 38 on the central shaft between shoulders 30a and 30b on the shaft and body member, respectively, and cam 54 secured to the central shaft also moves downwardly, allowing spring 28 to force the gauging surface 27b of the caliper arm to move inwardly toward the body member. When the device is lowered into the hole to the desired position at which a measurement is to be taken, the device is rotated by turning the tubing to which it is attached a few revolutions (depending upon the pitch of threads 31) against the frictional resistance offered by lower drag spring 13 against the inside wall of the casing. Spring 13 is fixedly attached to sleeve 29 to resist the tendency for the sleeve to rotate with the device. This causes joint 31 to be made up and bearing pin 32, push rod 33 and central shaft 37 are moved upwardly by the upper end of sleeve 40 attached to spring 13 and sleeve 29 to overcome the force of arm spring 28 and move gauging arms 27 outwardly to resiliently contact the wall of the casing. Then, as the caliper is drawn through the casing, the caliper arms follow variations in the casing wall.

When the device is latched in the operating position, the upper end of each caliper arm 27 contacts cam 54 through roller 30 on the arm. Outward radial movement of the caliper arms permit contral shaft 37 to move upwardly in the central body cavity, and inward radial movement of the arms are translated into a downward movement of the central shaft through the cam 54 attached to the central shaft.

Stylus 22 is actuated by the radial movement of caliper arms 27. The stylus is coupled to the caliper arms through cams 54 and central shaft 37 to which it is pinned securely by hub 39. Thus, when the central shaft moves longitudinally with respect to the body member, the stylus moves longitudinally in respect of the surface of the chart member 19. An increase in the diameter of the conduit to be measured results in the stylus moving upwardly on the chart, and similarly, a decrease in diameter causes the stylus to move downwardly on the chart. Thus, the longitudinal movement of the stylus is proportional to the radial movement of the caliper arms.

In order to provide a record of conduit diameter at successive intervals along the casing wall, the chart member is advanced in small increments when the device is moved in the hole. This is accomplished by raising the tool a few inches and then lowering it through the interval to be calipered, to provide a reciprocating motion necessary to advance the chart. While moving downwardly through the interval to be calipered, the upper drag spring 14 frictionally engages the casing well and moves up against stop 41. When the device is then raised a short distance, the upper drag spring shoulder 14a moves downwardly with respect to the body member to contact upper bearing pin 42 to force it downwardly. Bearing pin 42 is fixedly attached to chart advance shaft 43 slidably positioned in an upper contral cavity in the body member to move longitudinally therein. Upper helical compression spring 44 urges the chart advance shaft upwardly with respect to the body member. Secured to the chart advance shaft is a chart advance cam 46 connected to the shaft by pin 47, so that the chart advance cam moves longitudinally when the shaft is actuated by the reciprocating motion of the device in the hole as hereinbefore described.

The chart advance cam comprises a flat metal strip provided with a slot 48 formed at an angle, except for extensions paralleling the axis of the body member at each end to allow for overtravel. The inside surface of this slot serves as the cam surface contacted by pin 49 projecting radially from pawl drive segment 51 positioned in a circumferential race 50 in the body member. Movement of the chart advance shaft causes the pawl drive segment to rotate along its circumferential race 50 which is coaxial with the body member and pawl 52 secured to the segment extends downwardly to engage with the teeth of the circular gear member 23 provided on chart member 19. Thus, movement of the device upwardly with respect to upper drag spring 14 until bearing pin 42 is moved downward into the slot 53 causes chart advance shaft 43 and cam 46 to move downward with respect to pin 49 on pawl drive segment 51 rotatably mounted on the body member. Travel of the pin 49 along the surface 48 of cam 46 causes pawl drive segment 51 and hence the pawl 52 to rotate to the left (as shown) so as to engage with the teeth of the circular gear and incrementally rotate the chart. As the device is moved downwardly through the interval of casing to be calipered next, the spring 44 returns chart advance shaft 43 and pawl 52 to their normal position wherein the pawl engages with the circular gear on the chart member. This position is maintained until the device is again raised in the casing and reciprocated to advance the chart again to caliper another section.

A typical record provided by the above-described tool is illustrated in FIGURE 5. In this instance, the first interval calipered had a maximum inside diameter proportional to the distance *ac* plus the base of diameter (determined by design of the caliper arms, cam 54, etc.), while the minimum inside diameter was proportional to the distance *bc* plus the base diameter. The horizontal lines indicate the casing diameter at the point where the chart was advanced as described above.

From the foregoing description, it is seen that the present invention provides a recording caliper device which is rugged and simple in operation, with no field adjustments required. The device provides accurate and reliable measurements easily and rapidly, and can be run on a string with other tools so as to minimize the number of trips required into the hole.

From the above description of a preferred embodiment of the invention, various modifications and alterations in the details of construction will become apparent to the artisan, and such modifications and alterations are within the spirit and scope of the present invention.

We claim:

1. A recording device for making a record of a variable within a tubular object which device comprises:
   - an elongated body member adapted to be inserted into and moved within a tubular object;
   - a rotatable chart member mounted on said body member;
   - a marking member supported by said body member to contact the surface of said chart member;
   - the surface of said chart member being capable of being marked by said marking member;
   - said marking member being adapted to be connected to a sensing element and actuated thereby to move in respect to said chart surface and record thereon a variable which is to be measured;

a drive member mounted on said body member and operatively engageable with said chart member for incrementally rotating said chart member in respect of said marking member, said drive member being effective to rotate said chart member only when said device is moved in a reciprocating manner.

2. The device of claim 1 including disengaging means mounted on said body member to operatively contact said drive member and disengage the same from said chart member when said device is moved in a first direction; and means on said body member for engaging said drive member with said chart member when said device is moved in a second direction.

3. The device of claim 2 wherein said disengaging means comprises friction means slidably mounted on said body member for frictionally engaging with said tubular object and for lifting said drive member from said chart member when said device is reciprocated within said tubular object.

4. The device of claim 2 wherein said engaging means comprises a spring means on said body member for resiliently maintaining said drive member in contact with said chart member.

5. The device of claim 1 including a circular gear member adjacent one end of said chart member.

6. The device of claim 5 wherein said drive member comprises a pawl mounted on said body member and engageable with said circular gear member to rotate said chart member.

7. The device of claim 6 including means for resiliently maintaining said pawl in contact with said circular gear member.

8. The device of claim 6 including a pin connected to said pawl member, and a cam to contact said pin and cause said pawl to advance said chart member.

9. The device of claim 1 including a caliper element pivotally mounted on said body member to move radially in respect thereof for contact with the inside wall of said tubular object and operatively connected to said marking member to cause said marking member to travel over the surface of said chart member.

10. The device of claim 9 including a latching mechanism operatively connected to said caliper element for extending and retracting said caliper element to and from a calipering position.

11. A device for providing a record of the inside diameter of a tubular object, which device comprises:

an elongated body member adapted to be inserted into and moved within said tubular object;

multiple caliper arm members mounted on said body member to move radially thereon and contact the inside wall of said tubular object;

a marking member connected to said arm members and movable in response to the radial movement of said arm members;

a rotatable cylindrical chart mounted on said body member and adapted to be contacted by said marking member to provide a record of the movement of said marking member thereon;

a circular gear member connected to said chart;

a pawl mounted on said body member and operatively engageable with said gear member;

cam means on said body member to move said pawl;

means for disengaging said pawl from said gear member when said caliper arm members are moved in a first direction in said tubular object; and means for re-engaging said pawl with said gear member when said caliper arm members are moved in a second direction in said tubular object.

12. The device of claim 11 including a latching device coupled to said arm members for extending and retracting said arm members to and from an operating position.

13. A recording device for making a permanent record of a variable to be measured in a tubular object, which device comprises:

an elongated body member adapted to be inserted into and moved along the length of a tubular object;

a cylindrical chart member rotatably mounted around said body member;

a marking member movably supported on said body member to contact the surface of said chart member and to record thereon a variable to be measured;

a sensing element connected to said marking member to cause said marking member to travel over the surface of said chart member;

a circular gear on one end of said chart member;

a pawl movably mounted on said body member and engageable with said gear;

a resilient member contacting said pawl to cause said pawl to normally engage said gear;

a pin connected to said pawl;

a cam on said body member to operatively engage with said pin and move said pawl;

a friction element mounted on said body member to slide longitudinally thereon, said friction element being adapted to frictionally engage with the inside wall of said tubular object;

said friction element being adapted to disengage said pawl from said ratchet when said friction element slides in a first direction on said body member; and said resilient member being adapted to re-engage said disengaged pawl and gear to thereby rotate said chart member incrementally through a preselected angle of rotation when said friction element slides in a second direction on said body member.

14. A recording caliper for determining the inside diameter of a section of conduit which comprises:

an elongated body member adapted to be inserted into and moved within a conduit;

a plurality of caliper arms pivotally mounted on said body member to pivot thereon and contact the inside wall of the conduit;

a first shaft member slidably positioned on said body member;

a cam member positioned on said shaft member to contact said arms and move said arms outwardly;

a latching mechanism on said body member to actuate said cam when said caliper is rotated in said conduit;

a rotatable cylindrical chart on said body member;

a circular gear attached to said chart;

a stylus connected to said shaft to move longitudinally in respect of said chart and to contact said chart and mark the surface thereof;

a second shaft member slidably positioned on said body member;

a pawl movably positioned on said body member to operatively engage said gear and incrementally rotate said chart;

cam means on said body member to move said pawl;

means for disengaging said pawl from said gear when said caliper is moved in a first direction in said conduit; and means for re-engaging said pawl with said gear when said caliper is moved in a second direction in said conduit.

No references cited.

ISAAC LISANN, *Primary Examiner.*